United States Patent [19]

Katoh

[11] 4,319,292

[45] Mar. 9, 1982

[54] CASSETTE LOADING AND EJECTING APPARATUS

[75] Inventor: Hiroshi Katoh, Yokohama, Japan

[73] Assignee: Victor Company of Japan, Ltd., Yokohama, Japan

[21] Appl. No.: 107,587

[22] Filed: Dec. 27, 1979

[30] Foreign Application Priority Data

Dec. 28, 1978 [JP] Japan ............................. 53-163753

[51] Int. Cl.³ ..................... G11B 15/66; G11B 15/24
[52] U.S. Cl. .................................. 360/96.5; 242/198
[58] Field of Search .................. 360/96.5, 96.6, 93; 242/198–204

[56] References Cited

U.S. PATENT DOCUMENTS

| | | | |
|---|---|---|---|
| 3,902,680 | 9/1975 | Neff | 242/198 |
| 3,936,011 | 2/1976 | Staar | 242/198 |
| 3,957,225 | 5/1976 | Vogel | 242/198 |
| 4,014,041 | 3/1977 | Cicatelli | 360/96.5 |
| 4,099,213 | 7/1978 | Schatteman | 360/96.5 |
| 4,208,023 | 6/1980 | Demol | 360/96.5 |

FOREIGN PATENT DOCUMENTS 54-106212 8/1979 Japan .................. 360/96.5

*Primary Examiner*—Alfred H. Eddleman

[57] ABSTRACT

A cassette loading and ejecting apparatus effects loading operation under the force of gravity and ejection operation by rotational force of a motor. The apparatus comprises a mechanism for locking a cassette holder interrelatedly with cassette loading motion, and an ejection mechanism for effecting cassette ejection operation including the operation of releasing the lock mechanism. When the cassette has been ejected, the ejection mechanism and the cassette holder are mechanically disconnected to permit cassette loading operation to be effected without applying any force to the ejection mechanism.

7 Claims, 10 Drawing Figures

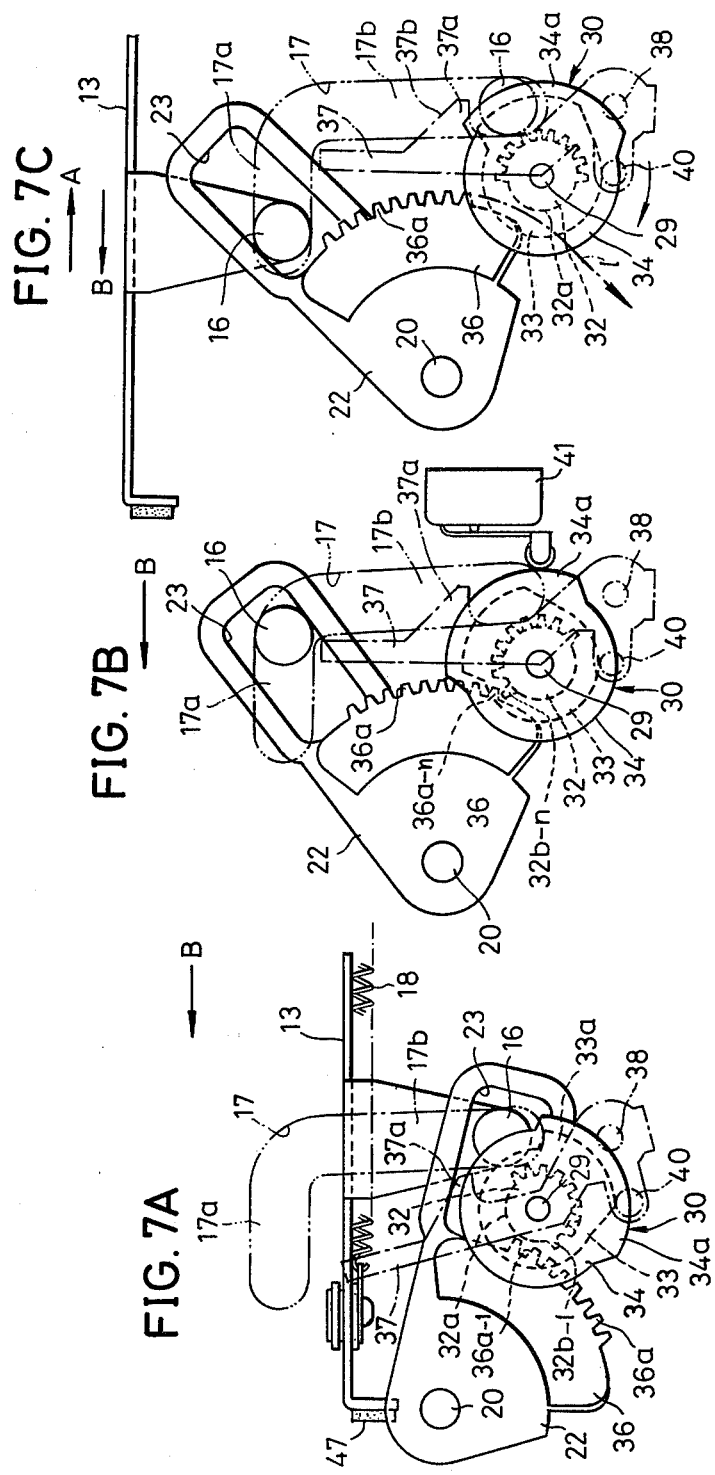

CASSETTE LOADING AND EJECTING APPARATUS

BACKGROUND OF THE INVENTION

This invention relates generally to apparatuses for loading and ejecting cassettes, and more particularly to a cassette loading and ejection apparatus wherein loading is effected by the force of gravity and ejection, including the release of a lock for securing the cassette in its loaded position, is effected responsive to an ejection order.

There has heretofore been known an apparatus adapted to effect loading of a cassette by utilizing the force of gravity and utilizing the rotational force of a motor only for ejecting the cassette. This apparatus is of a construction in which a link is connected to a rotary member and a pin embedded in a cassette holder is fitted into a slot formed in the link. One turn of the rotary member causes the cassette to move from loaded position to ejected position.

However, this apparatus has no mechanism for locking the cassette holder in its loaded position incorporated therein and the locking mechanism is disposed apart from the loading and ejection apparatus and is adapted to be operated responsive to the manual operation for rendering the recording and/or reproducing apparatus operative. Moreover, the lock releasing operation at the time of cassette ejection is not effected interrelatedly with the rotation of the rotary member but is effected responsive to a manual operation for cassette ejection. Moreover, in the above apparatus, the force for rotating the rotary member is obtained by way of a rotation transmission path from the recording/reproducing apparatus, and one-turn control of the rotary member is carried out by cutting off the transmission loop by a plunger solenoid. Accordingly, the known apparatus involves disadvantages in that the structure is complicated and assembly of the apparatus into the recording/reproducing apparatus is extremely troublesome.

Furthermore, since the link is connected to the rotary member, there arises disadvantage in that any mechanical impact occurring when cassette is loaded is adversely transmitted through the link mechanism to the rotary member.

SUMMARY OF THE INVENTION

It is a general object of the present invention to provide a novel and useful cassette loading and ejection apparatus in which the above described disadvantages have been overcome.

Another and specific object of the invention is to provide a cassette loading and ejection apparatus which is capable of effecting cassette ejection operation, including the operation of releasing a locking member for continuously locking the cassette in its loaded position.

A further object of the present invention is to provide a cassette loading and ejection apparatus of a unit construction wherein a rotational drive source and a locking mechanism are incorporated into a structure for supporting a cassette holder.

Other objects and further features of the invention will be apparent from the following detailed description with respect to a preferred embodiment of the invention when read in conjunction with the accompanying drawings.

BRIEF DESCRIPTION OF THE DRAWING

In the drawings:

FIGS. 7A, 7B and 7C are side views respectively showing essential parts of an apparatus according to the invention at different time instances during cassette ejection operation.

DETAILED DESCRIPTION OF THE INVENTION

Figure 1:
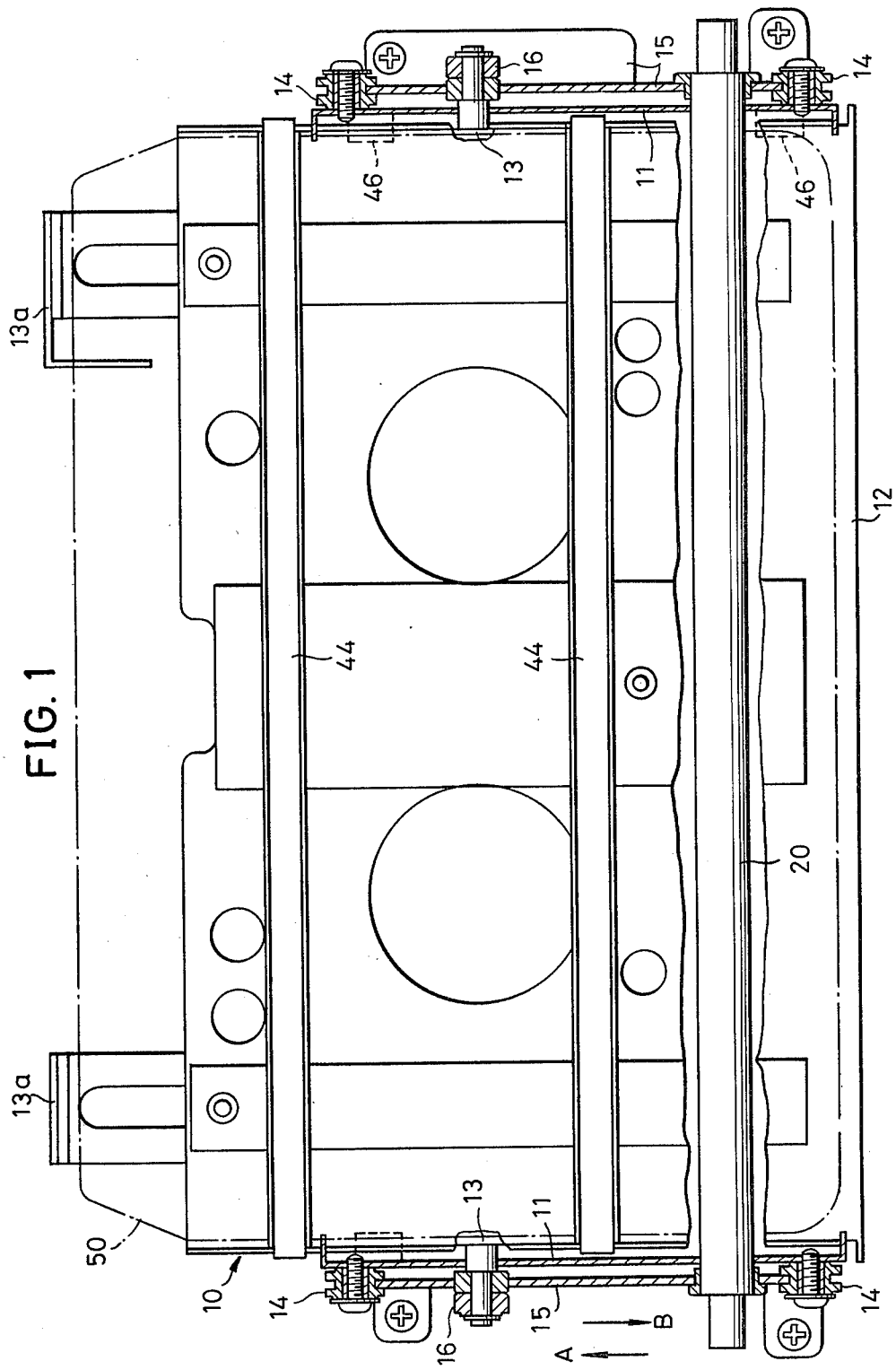
FIGS. 1 and 2 are a plan view and a front view, respectively, partly in section and with parts cut away, showing one embodiment of a cassette loading and ejection apparatus according to the present invention in its loaded state and with the driving unit removed.

Referring to FIGS. 1 through 4, a cassette loading and ejection apparatus according to the present invention is substantially of a construction wherein a driving unit is additionally incorporated in a manual-operation type cassette loading and ejection apparatus of the type known hitherto.

A cassette holder 10 comprises a support frame 12 either side of which is loosely skrewed to one of a pair of U-shaped plates 11, and a slide plate 13 provided under the support frame 12 to slide in the directions indicated by arrows A and B. The U-shaped plates 11 move upwards and downwards together with the cassette holder 10, with a plurality of guide rollers 14 supported rotatably on the plates 11 being guided along the lateral edges of associated up-right guide plates 15 fixed to the chassis of a recording and/or reproducing apparatus (neigher of which is shown). Rollers 16 are supported on pins embedded in arms at the lateral sides of the slide plate 13. Each roller 16 is fitted into an L-shaped guide slot 17 formed in the associated guide plate 15 so as to move therealong. With the movement of the roller 16 along the slot 17, the support frame 12 moves vertically and the slide plate 13 horizontally and vertically, thus carrying out the cassette loading and ejection operation as described later.

The slide plate 13 is constantly urged to move in the direction of arrow B, that is, toward cassette inserting and ejecting opening, by a spring 18.

Figure 4:
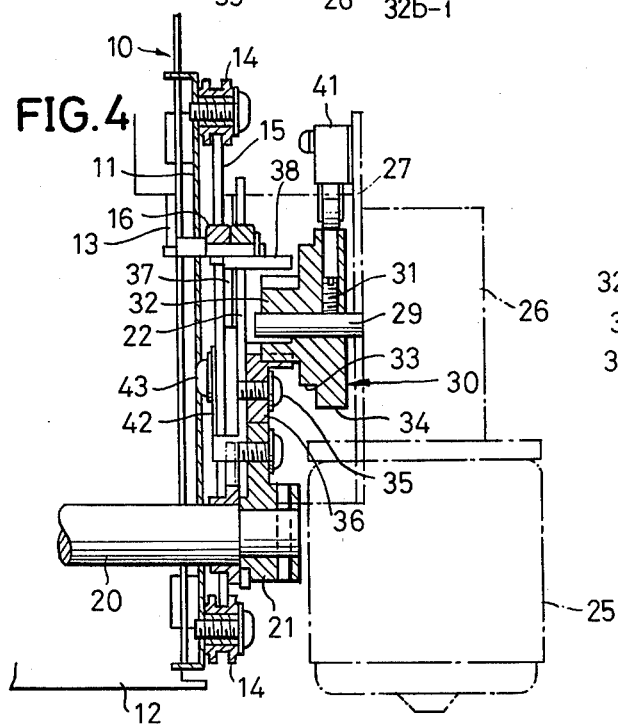
FIG. 4 is a plan view, partly in section, showing the driving unit of an apparatus according to the present invention.

A horizontal rotatable shaft 20 extends transversely between the guide plates 15. A bushing 21 is pin-connected to the shaft 20 at one end thereof, and an arm 22 is fastened to the bushing 21 by screws, as indicated in FIG. 4. A slot 23 formed in the arm 22 holds the roller 16 therein. The same mechanism is provided at the opposite end of the shaft 20. Accordingly, with the rotation of the shaft 20, the cassette holder 10 is imparted with equal upward force at the left and right sides thereof by way of the rollers 16 in the arm slots 23, which ensures smooth motion of the cassette holder 10.

Figure 3:
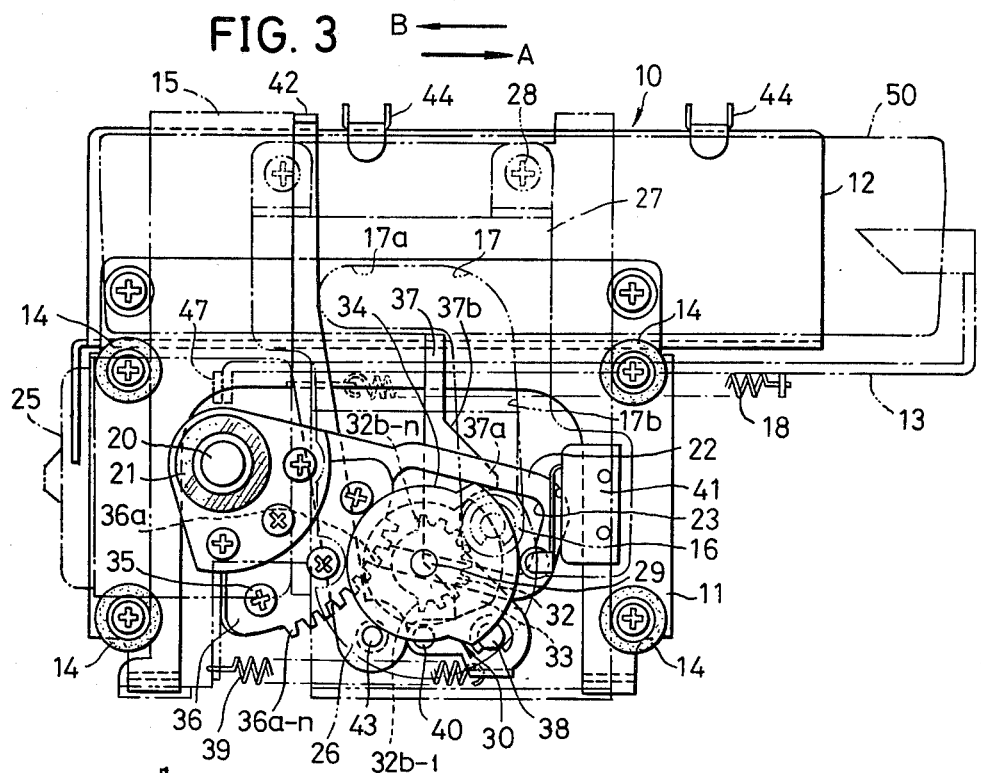
FIG. 3 is a side view of an apparatus according to the invention in its loaded state.

Particularly referring to FIGS. 3 and 4, a driving unit (shown in single-dot chain lines) composed of a motor 25 and an output-shaft unit 26 having worm gearing incorporated therein is screwed to a bracket 27 (shown in single-dot chain lines), which is fastened to the guide plate 15 by screws 28. A rotary structure 30 which constitutes an essential part of the present invention is fixed to the output shaft 29 of the unit 26 in a specific angular orientation.

Figure 5:
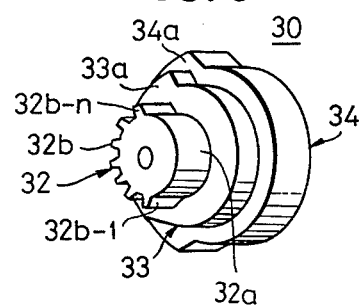
FIG. 5 is a view of the unitary rotary structure as shown in FIGS. 3–4.

As shown in FIG. 5, the rotary structure 30 is a unitary structure formed of a sector gear 32 having an untoothed portion over a specific angular extent, a first cam 33, and a second cam 34.

The sector gear 32 has an untoothed part 32a extending over an angle of about 180 degrees and a gear toothed part 32b which meshes, only over a specific angular range, with gear teeth 36a of a sector-shaped gear block 36 fixed to the arm 22 by screws 35. Also, in the gear block 36, the gear teeth 36a is formed only over a specific angular range. With this arrangement, the sector gear 32 is brought into meshed engagement with the gear block 36 only in the cassette holder lifting process, and applies lift force to the cassette holder 10.

The first cam 33 operates over a specific angular range of rotation to move a lock arm 37 to its inoperative position. The lock arm 37 is rotatably supported at its lower end part by a pin 38 embedded in the guide plate 15 and is urged to rotate in the clockwise direction as viewed in FIG. 3 by a spring 39. A lock lug 37a of the lock arm 37 is thereby positioned to lock the roller 16. The lock arm 37 has a pin 40 positioned to face the first cam 33.

The second cam 34 cooperates with a microswitch 41 for detecting its angle of rotation. The microswitch 41 is screwed to the bracket 27.

An operation lever 42 is rotatably supported at its lower end by a screw 43 on the inside surface of the guide plate 15, and serves to lower the cassette holder 10 to its loaded position in the state where no cassette is inserted thereinto.

The apparatus of the above described construction is of unit structure as a single assembly structure together with the driving source. Accordingly, assembly of the cassette loading and ejection apparatus into the recording/reproducing apparatus is facilitated since it does not entail troublesome operations such as meshing gears with each other.

Figure 8:
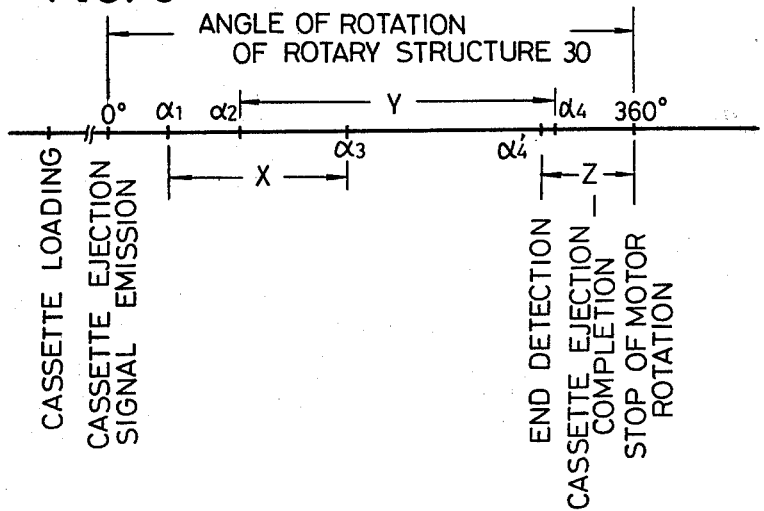
FIG. 8 is a diagrammatic chart showing how cassette ejection operation is carried out in an apparatus according to the present invention.

The operation of the apparatus in loading and extracting a cassette will now be described, in further reference with FIGS. 6 through 8.

Figure 6:
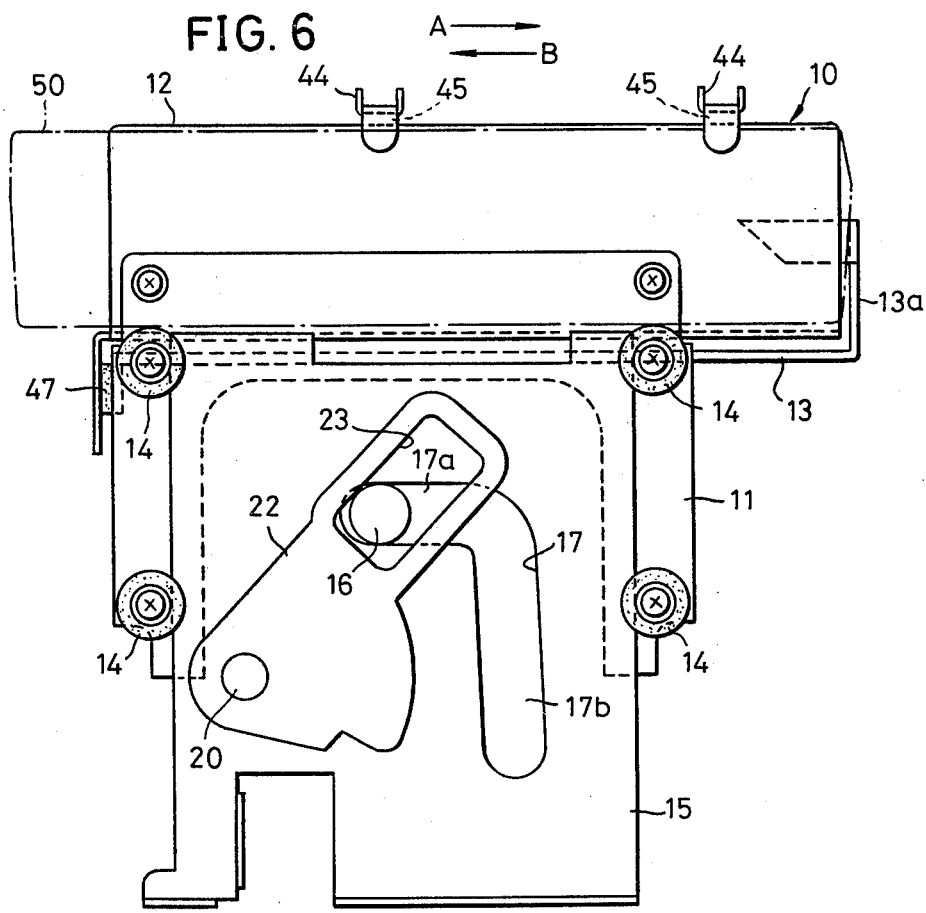
FIG. 6 is a side view of an apparatus according to the present invention in its state at the start of cassette loading or completion of cassette ejection.

Before loading of a cassette, the apparatus assumes the state indicated in FIG. 6 and FIG. 7C. The cassette holder 10 is at a lifted position and the slide plate 13 is shifted in the direction of arrow B. The sector gear 32 is at a rotational position where the untoothed part 32a is opposite the path of the gear teeth of the gear block 36. Accordingly, the arm 22 is free from mechanical connection with the sector gear 32, and is therefore free to turn in the clockwise direction.

With the cassette holder 10 in the above described state, a video cassette 50 is inserted therein in the direction of arrow A. The forward end of the video cassette 50 pushes bent portion 13a of the slide plate 13, which is thereby caused to slide in the direction of arrow A with the roller 16 being guided by the horizontal part 17a of the guide slot 17, counter to the force of the spring 18. When the cassette 50 has been inserted to a predetermined position, the roller 16 reaches a curve in the guide slot 17. Following this, the cassette 50, holder 10 and slide plate 13 are unitarily moved downwards by the force of gravity (under their own weight). The roller 16 is guided by the vertical part 17b of the guide slot 17. Therefore, when the roller 16 moves along the guide path 17, the arm 22 turns clockwise.

When the cassette 50 moves downwards, the roller 16 comes to abut against a slant part 37b of the lock arm 37 and pushes it aside. That is, the lock arm 37 is turned once counterclockwise counter to the spring 39 due to the action of the roller 16 and is then returned back after the roller 16 passes the lock lug 37a. The downward movement of the cassette holder 10 comes to stop immediately after the roller 16 passes by the lock lug 37a. Accordingly, the cassette 50 is loaded at a specific position with the cassette holder 10 being automatically locked by the lock arm 37.

The cassette holder 10 further moves downwards somewhat independent of the cassette 50 after it reaches the loading position. As a result, the cassette 50 is held in the loaded position with the top surface thereof pushes down by felt strips 45 under top cross bars 44 of the cassette holder 10. The felt strips 45 also serve to relieve mechanical impact which occurs when the cassette housing 10 moves downwards.

Furthermore, as the cassette is loaded, the arm 22 and gear block 36 rotate independently of such driving system elements as the motor and reach the position indicated in FIG. 3.

Figure 2:
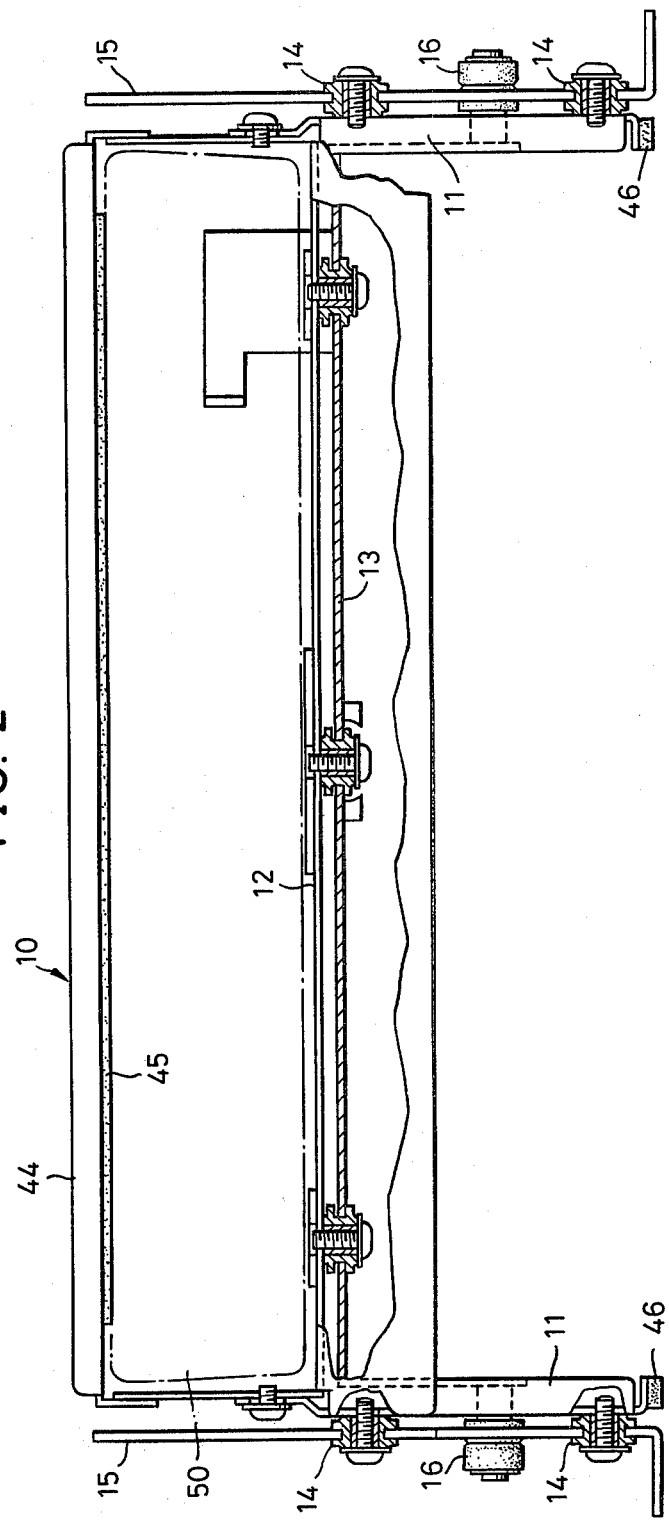

When the cassette 50 has been loaded, the cassette loading and ejection device assumes the state shown in FIGS. 1, 2 and 3.

Since the cassette holder 10 is automatically locked when the cassette 50 is loaded, no manually operated mechanism is required for locking the cassette holder after tape loading and this simplifies the structure of the device. Moreover, the video cassette 50 is firmly held in the loaded position during such operations of the recording/reproducing apparatus as tape loading, fast-forwarding, rewinding, recording, and reproducing after the cassette 50 has been loaded.

Next, a description is given of the operation for depressing the cassette holder 10 with no video cassette inserted therein. Depressing of the only cassette holder 10 is required for example when the recording/reproducing apparatus is to be carried from one place to another.

For depressing the cassette holder 10, the operation lever 42 is pushed in the direction of arrow A to rotate it clockwise. As it rotates, the lever 42 pushes the roller 16 to move it in the direction of arrow A along the horizontal part 17a of the guide slot 17. When the roller 16 reaches the curved part of the guide slot 17, the cassette holder 10 descends under the force of gravity and the roller 16 is locked by the lock arm 37 as in the preceding case. Any mechanical impact is cushioned by felt strips 46 attached to the bottom of the U-shaped plates 11 when they come against the chassis of the recording/reproducing apparatus.

Next to be described is cassette ejecting operation through the use of the rotational force of the motor.

Assume that the cassette 50 has been loaded as indicated in FIG. 3 and that the device of the present invention receives a cassette ejection signal. Responsive to the cassette ejection signal, the motor 25 starts to rotate and the output shaft 29 of the output shaft unit 26 thereby rotates clockwise together with the rotary structure 30. Due to the rotation of the rotary structure 30, the device of the invention operates as indicated in FIGS. 7A through 7C, and FIG. 8.

When the rotary structure 30 has rotated by an angle $\alpha 1$, a cam part 33a of the first cam 33 pushes the pin 40 to turn the lock arm 37 counterclockwise, counter to the spring 39. The lock lug 37a of the arm 37 thereby shifts away from its position directly above the roller 16. Accordingly, the device assumes a state where the lock arm 37 is inoperative with respect to the roller 16, as illustrated in FIG. 7A. In FIG. 8, X designates the time period during which the unlocked state continues.

When the rotary structure 30 has rotated by an angle of $\alpha 2$, the gear tooth 32b-1 at the leading end in the rotational direction of the sector gear 32 comes into engagement with an intertooth space 36a-1 of the gear part 36a of the gear block 36. Thereafter, over about 180 degree of rotation of the rotary structure 30 (this rotational range being designated by Y in FIG. 8), the gear part 32b continues to mesh with the gear part 36a of the gear block 36. During this gear meshing period, the rotation of the sector gear 32 is transmitted to the gear block 36, and the arm 22 and the shaft 20 thereby rotate counterclockwise.

Initial rotation of the rotary structure 30 for the angle $\alpha 2$ is carried out with the untoothed part 32a thereof opposed to the gear part 36a of the gear block 36 with a gap interposed therebetween. Therefore, no mechanical transmission path exists between the section gear 32 and the gear block 36 and, as a result, the arm 22 remains at its initial position.

The rotation of the arm 22 is transmitted by way of the slot 23 to the roller 16, which thereby moves upward along the vertical part 17b of the guide slot 17. The cassette holder 10 moves upward along the guide plates 15 together with the cassette 50 accommodated therein.

When the rotary structure 30 reaches an angle of $\alpha 3$, the roller 16 passes by the lock lug 37a at its released position, and the pin 40 is relatively moved from the cam part 33a of the first cam 33. As a result, the lock arm 37 is turned clockwise by the spring 39 and is restored to its locking position.

When the rotary structure 30 rotates further and reaches an angle of $\alpha 4$, the last tooth 32b-n in the gear part 32b of the sector gear 32 pushes upward the last tooth 36a-n in the gear part 36a of the gear block 36, and the rotation transmission path from the sector gear 32 to the gear block 36 is opened and remains open thereafter.

At this stage of operation, the roller 16 is located at the top of the vertical part 17b, that is, above the curved part of the guide slot 17. Accordingly, due to the force of the spring 18, the slide plate 13 slides in the direction of arrow B, together with the movement of the roller 16 along the horizontal part 17a. As the slide plate 13 moves, the cassette 50 within the cassette holder 10 is engaged at the front face thereof and is pushed in the direction of arrow B outside the cassette holder 10. The cassette 50 is resultingly ejected. The slide plate 13 moves up to a position where a felt strip 47 at the rear end thereof abuts against a bent part of the cassette holder 10.

As the slide plate 13 moves horizontally, the arm 22 is caused to turn further counterclockwise by the roller 16 fitted in the slot 23. At this time, the gear block 36 and the sector gear 32 assume positions where their untoothed parts oppose each other, thus allowing the arm 22 to turn freely.

At the time instant when the roller 16 moving upwards reaches the curved part of the L-shaped slot 17, that is, when the rotary structure 30 reaches the angle $\alpha 4'$ immediately before the angle $\alpha 4$, a cam part 34a of the second cam 34 pushes the actuation lever of the microswitch 41 to render it "ON." Responsive to the "ON" state of the microswitch 41, an order to stop rotation of the motor 25 is sent to the control system of the apparatus.

As a result, electric power supply to the motor 25 is interrupted, and, at the same time, the input terminals to the motor 25 are shortcircuited. The motor 25 thereafter functions as a generator and applies an electrical braking force with respect to ensuring inertial rotation. The motor 25 thus comes to a stop with only a small inertia rotation. The angle of inertial rotation is designated by Z in FIG. 8. The result is that the rotational structure 30 rotates for exactly 360 degree. Instead of the electrical braking means described above, a mechanical braking mechanism may be used.

Accordingly, the cassette loading and ejection apparatus comes to assume the state illustrated in FIGS. 6 and 7C.

The cassette ejection operation is carried out with the cassette holder 10 supported at either side thereof by an associated arm 22 rotating together with the shaft 20.

In the state indicated in FIG. 7C, the untoothed part of gear block 36 confronts the untoothed part of the sector gear 32. This means that the rotary structure 30 rotates by 360 degrees independently of the gear block 36. Accordingly, even if the control system should receive a cassette ejection order in the state where the cassette has been ejected, no transmission of rotational motion can take place between the driving sector gear 32 and the driven gear block 36, so that no trouble arises.

Moreover, the position where rotation of the rotary structure 30 comes to stop is always the same with respect to the position of the microswitch 41. Accordingly, even in a state where the cassette ejection operation has being interrupted midway as by a power failure or the like, the rotary structure 30 will resume rotation up to the above described stop position upon receipt of another cassette ejection order, whereby the cassette is ejected normally.

Next, a description is given of the operation for hoisting the cassette holder 10 without the use of rotational force of the motor 25. This manual hoisting (ejecting) operation is required when the electric power supply is cut off or when there has been a malfunction.

For hoisting the cassette housing 10, a special tool or an ordinary tool such as screw driver is inserted between the guide plate 15 and the rotatable arm 22 to catch the top end of the lock arm 37 and to turn it counterclockwise against the spring 39. Accordingly, the cassette holder 10 is set free from restriction against upward movement thereof. In this state, the operator grasps the top of the cassette holder 10 and pulls it upward. In the cassette loaded state, the sector gear 32 is stopped with the untoothed part 32a thereof confronting the gear block 36, and the gear block 36 is capable of rotating independently of the sector gear 32, as indicated in FIG. 3. Accordingly, the manual cassette ejecting operation can be carried out without any trouble.

In the embodiment described above, untoothed parts are formed both in the gear 32 and the gear block 36, but an arrangement wherein an untoothed part is formed only in the gear 32 may also be adopted.

Further, this invention is not limited to these embodiments but various variations and modifications may be made without departing from the scope of the invention.

What is claimed is:

1. A cassette loading and ejection apparatus comprising:
    a holder for receiving and holding a cassette inserted thereinto, said holder being moved downwards for placing said cassette into a predetermined loaded position and moved upwards for ejecting said cassette from the loaded position;
    a mechanism for locking said holder at the loaded position interrelatedly with downward movement of said holder;
    an intermediate member connected with said holder so as to move in one direction as said holder moves downwards and to cause said holder to move upwards due to motion thereof in the opposite direction;
    a rotational driving source which turns responsive to an incoming ejection order when said holder is at the loaded position;
    a lock releasing mechanism operated responsive to initial rotation of said rotational driving source for rendering said locking mechanism inoperative; and
    a selective transmission mechanism for selectively transmitting rotation of said rotational driving source to said intermediate member after said lock releasing mechanism is operated, for the period of time during which said holder is required to be lifted, said transmission mechanism being in a released state when the cassette has been ejected.

2. An apparatus as claimed in claim 1 which further comprises a supporting structure for supporting said holder movably upward and downward, said supporting structure having said rotational driving source, said locking mechanism and said lock releasing mechanism incorporated therein.

3. An apparatus as claimed in claim 1 in which said lock releasing mechanism comprises a cam member rotated by said rotational driving source.

4. An apparatus as claimed in claim 1 in which said selective transmission mechanism comprises a gear rotated by said rotational driving source at a position opposed to said intermediate member, said gear having an untoothed part formed over a predetermined angle thereof.

5. An apparatus as claimed in claim 1 in which said lock releasing mechanism comprises a cam member rotated by said rotational driving source, and said selective transmission mechanism comprises a gear rotated by said rotational driving source at a position opposed to said intermediate member, said gear having an untoothed part formed over a predetermined angle thereof, said cam member and said gear being a unitary structure.

6. An apparatus as claimed in claim 1 in which said locking mechanism comprises a locking arm which has a lug for latching said holder located at the loaded position, and an end part extending up to a position accessible to an operator from outside.

7. An apparatus as claimed in claim 5 which further comprises a switch which cooperates with said unitary structure to detect one turn of said unitary structure, said rotational driving source stopping rotation responsive to detection operation of said switch.

* * * * *